(Model.)
R. W. TRAYLOR.
JOURNAL BEARING AND BOX.
No. 263,629. Patented Aug. 29, 1882.
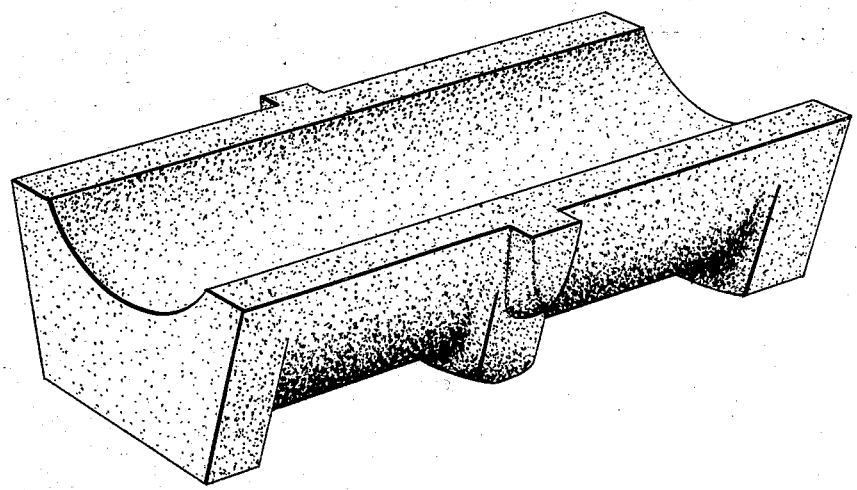
Witnesses.
Robert Everett.
J. A. Rutherford
Inventor.
Robert W. Traylor,
By James L. Norris.
Atty.

UNITED STATES PATENT OFFICE.

ROBERT W. TRAYLOR, OF RICHMOND, VIRGINIA.

JOURNAL BEARING AND BOX.

SPECIFICATION forming part of Letters Patent No. 263,629, dated August 29, 1882.

Application filed May 25, 1882. (Model.)

*To all whom it may concern:*

Be it known that I, ROBERT W. TRAYLOR, a citizen of the United States, residing at Richmond, Henrico county, Virginia, have invented new and useful Improvements in Journal Bearings and Boxes, of which the following is a specification.

The object of my invention is to provide new and improved composition boxes or bearings for journals, axles, shafts, and other purposes, which will possess the inherent characteristics of lubricating the axle or shaft and at the same time decreasing friction and avoiding heating of the box or bearing and axle or shaft. This object I accomplish by molding, casting, or otherwise forming or shaping the box or bearing from a compound composed of powdered or granulated mica or mica scales and gum-arabic or other suitable cement, with or without the addition of ordinary starch or flour.

The drawing shows a perspective view of a journal-bearing made according to my invention.

In the accompanying drawing I show a journal-bearing of ordinary shape with composition cast, pressed, or molded upon a metallic frame; but the bearing can be made from the composition and afterward set or secured in a suitable metallic frame or box.

The box or bearing A may be of any suitable and known form, and in making the same I first produce a plastic composition in the following manner: I take of ordinary starch or flour one pound, to which is added two quarts of water and one-quarter pound dissolved gum-arabic, to which is subsequently added six pounds of finely-reduced mica, in the form of powder or scales. This mass is thoroughly mixed until all the ingredients are effectually incorporated and brought to a stiff condition, after which the composition is molded, cast, or otherwise formed into the desired shape of journal box or bearing required, and then baked or dried in a slow oven or drying-oven, or by any other suitable means. The starch or flour is used to give body to the compound and cause it to set hard, and the gum-arabic or other cement is used to bind the ingredients together. The box or bearing can be pressed into the form or configuration required by means of a hydraulic or other power press, and thus the mass will be closely compressed into a compact body and form a substantial, durable, and self-lubricating journal box or bearing.

I have found that a box or bearing of the character set forth will act as a non-conductor, and hence it decreases the liability of the box or bearing becoming heated. It possesses very efficient lubricating qualities, and hence reduces friction, and it is light, but sufficiently substantial for the purposes intended.

I sometimes add to the composition herein described about one pound of finely-reduced Babbitt metal, brass, lead, or like metal, thereby increasing the rigidity of the structure and its efficient properties as a self-lubricator.

A journal box or bearing possessing the characteristics described may be inclosed by a metallic frame or box of skeleton form, if desired; or the composition can be molded or pressed around or upon a metallic supporting-frame into the form required for use, as represented in the drawing.

I have found that the reduced or powdered mica will give satisfactory results with the gum-arabic or other cement, omitting the starch or flour, and therefore I do not limit myself to the combination of mica, starch or flour, and gum-arabic or other cement; nor do I limit myself to any particular form of box or bearing, as such can be of any construction desired or found necessary.

What I claim is—

1. The method herein described of making journal boxes or bearings, which consists in molding, casting, or pressing a composition of powdered mica or mica scales and a suitable cement into the proper form, and then baking or drying the same, substantially as described.

2. A journal box or bearing composed of a composition of mica and a suitable cement, substantially as described.

3. A journal box or bearing composed of a composition of mica, starch or flour, and a suitable cement, substantially as described.

4. A molded, cast, or pressed journal box or bearing composed of mica and a suitable cement, substantially as described.

5. A molded, cast, or pressed journal box or bearing composed of mica, starch or flour, and a suitable cement, substantially as described.

6. A journal-bearing consisting of a composition of mica and suitable cement molded or cast upon or around a metallic supporting-frame, substantially as described.

In testimony whereof I have hereunto set my hand in the presence of two subscribing witnesses.

ROBERT W. TRAYLOR.

Witnesses:
J. C. JOPLIN,
JOS. B. BEASLEY.